United States Patent
Milpied et al.

(10) Patent No.: US 11,118,967 B2
(45) Date of Patent: Sep. 14, 2021

(54) RADIATION SENSOR COMPRISING A RADIATION SCREEN FOR DETECTING A SUN LOAD ACTING ON A VEHICLE

(71) Applicant: MEAS France SAS, Toulouse (FR)

(72) Inventors: Jean Milpied, Paris (FR); Emilien Durupt, Francarville (FR); Yannick Vidal, Cugnaux (FR); David Mirassou, Toulouse (FR)

(73) Assignee: MEAS FRANCE, Toulouse (FR)

( * ) Notice: Subject to any disclaimer, the term of this patent is extended or adjusted under 35 U.S.C. 154(b) by 53 days.

(21) Appl. No.: 16/295,867

(22) Filed: Mar. 7, 2019

(65) Prior Publication Data
US 2019/0277689 A1   Sep. 12, 2019

(30) Foreign Application Priority Data
Mar. 8, 2018  (EP) .................................. 18305246

(51) Int. Cl.
*G01J 1/42*   (2006.01)
*G01J 1/04*   (2006.01)
(Continued)

(52) U.S. Cl.
CPC .......... *G01J 1/4228* (2013.01); *G01J 1/0266* (2013.01); *G01J 1/0437* (2013.01); *G01J 1/0474* (2013.01);
(Continued)

(58) Field of Classification Search
CPC .......... G01J 1/4228; G01J 1/0266; G01J 1/06; G01J 1/0488; G01J 1/0474; G01J 1/0437;
(Continued)

(56) References Cited

U.S. PATENT DOCUMENTS

| | | | |
|---|---|---|---|
| 6,297,740 B1 * | 10/2001 | Hill | G01J 1/04 250/203.4 |
| 6,888,120 B2 * | 5/2005 | Chiasson | B60H 1/0075 250/203.4 |

(Continued)

FOREIGN PATENT DOCUMENTS

| | | |
|---|---|---|
| DE | 102005006472 A1 | 8/2006 |
| EP | 3144648 A2 | 3/2017 |

OTHER PUBLICATIONS

Extended European Search Report, European Application No. 18305246. 3-1020, European Filing Date, Sep. 5, 2018.

*Primary Examiner* — Jennifer D Bennett

(57) ABSTRACT

The present invention relates to a radiation sensor, in particular for use with a vehicle sunload sensor arrangement. Furthermore, the present invention also relates to such a vehicle sensor arrangement and to a method of assembling a vehicle sensor arrangement. A radiation sensor comprises at least one first and one second photodetector, and a radiation shaping element, wherein said radiation shaping element comprises radiation blocking means for forming at least one aperture through which the radiation has limited access to said first and second photodetectors, and wherein said first and second photodetectors are arranged on a substrate and are distanced apart from each other along a sensor axis, and wherein the radiation blocking means is formed by a radiation screen mounted on the substrate to encompass the first and second photodetectors.

20 Claims, 7 Drawing Sheets

(51) Int. Cl.
*G01S 3/784* (2006.01)
*G01W 1/02* (2006.01)
*G01J 1/02* (2006.01)
*G01J 1/06* (2006.01)

(52) U.S. Cl.
CPC .............. *G01J 1/0488* (2013.01); *G01J 1/06* (2013.01); *G01S 3/784* (2013.01); *G01W 1/02* (2013.01); *G01J 2001/4266* (2013.01)

(58) Field of Classification Search
CPC ............ G01J 2001/4266; G01J 1/0242; G01J 1/0403; G01W 1/02; G01S 3/784
See application file for complete search history.

(56) References Cited

U.S. PATENT DOCUMENTS

| | | | |
|---|---|---|---|
| 7,560,676 B2 | 7/2009 | Moon | |
| 8,785,858 B2* | 7/2014 | Knittel | H01L 31/02325 250/349 |
| 2002/0122314 A1* | 9/2002 | Kojima | G01J 3/36 362/555 |
| 2008/0128586 A1* | 6/2008 | Johnson | G01S 3/7861 250/203.4 |
| 2012/0007507 A1* | 1/2012 | Niemann | G01D 21/02 315/82 |
| 2013/0037700 A1* | 2/2013 | Michiyama | G01J 1/44 250/208.2 |
| 2017/0108372 A1* | 4/2017 | Reichel | H01L 27/1462 |

* cited by examiner

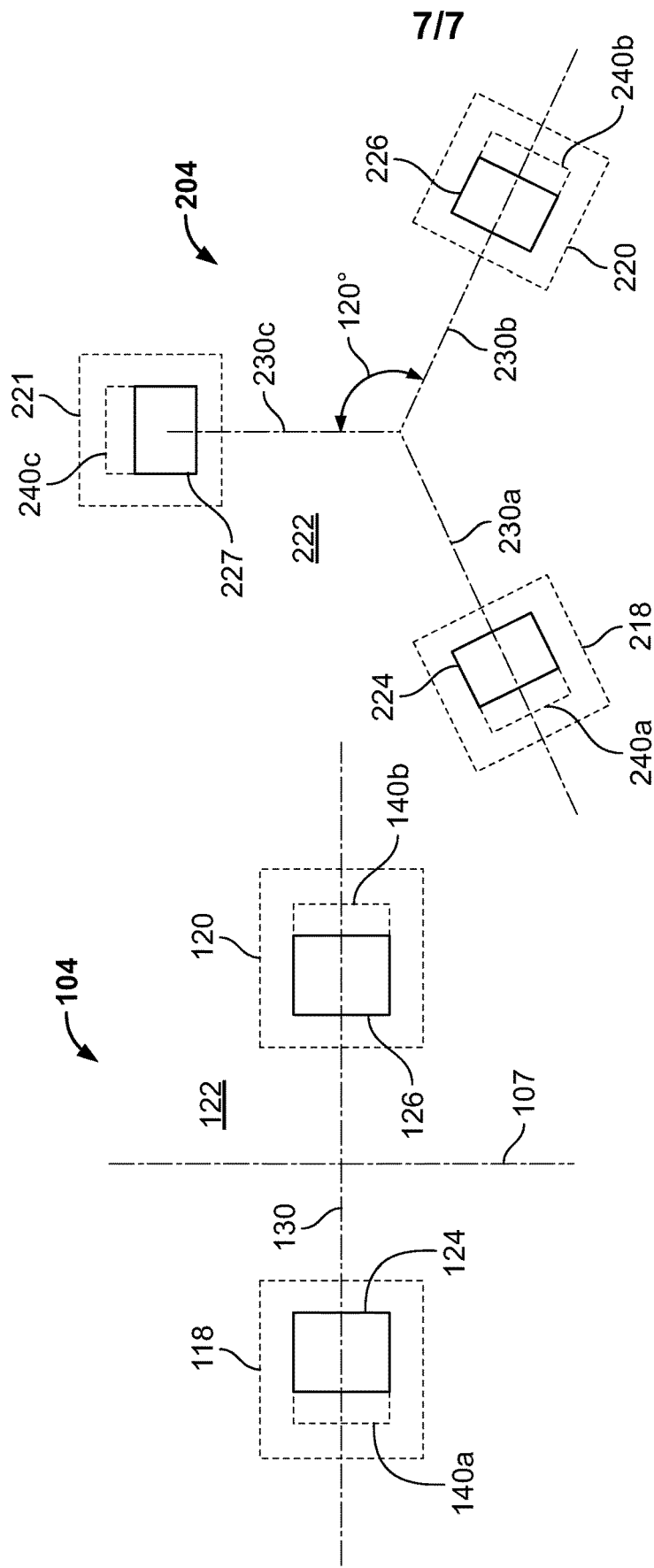

RADIATION SENSOR COMPRISING A RADIATION SCREEN FOR DETECTING A SUN LOAD ACTING ON A VEHICLE

CROSS-REFERENCE TO RELATED PATENT APPLICATION

This patent application claims the benefit of European Patent Application No. 18305246.3 filed on Mar. 8, 2018, which patent application is hereby incorporated by reference in its entirety.

FIELD

The present invention relates to a radiation sensor, in particular for use with a vehicle sunload sensor arrangement. In particular, the radiation sensor according to the present invention may detect electromagnetic waves which are typical for the sunload of a vehicle. Furthermore, the present invention also relates to such a vehicle sensor arrangement and to a method of assembling a vehicle sensor arrangement.

BACKGROUND

In modern cars, heating, venting, and air conditioning (HVAC) systems are able to be controlled by a large amount of input parameters, one of them being the sunload.

Sunlight entering a vehicle can account for a significant amount of the interior heat load that the HVAC system must overcome. Sunload sensors monitor the intensity of sunlight and adjust the HVAC control to improve the comfort level of the driver and passengers on sunny days. Conventional sunload sensors are usually located at the top of the dash and are often mounted on a removable plate, speaker grill, or defroster vent. There is often one on either side of the dash to accommodate differences in sunlight exposure.

Most sunload sensors are of the photodiode (PD) type, which provides a current proportional to the amount of photons received, so the signal from the sensor increases as the sun shines brighter. The operating range may for instance be between 0 and 1 mA, and as the sunload increases, the current increases. The signal is sent to the unified meter and A/C amp, which provide instructions to the system to adjust blend doors and fan speed. Bright sunlight conditions can result in the fan speed increasing, and blend doors opening to improve cooling.

For adequate control and energy saving as well as an increased driver and passenger comfort, multizone solar sensors are used that provide sunload data in order to separately control the car cabin temperature in two zones (left/right) or even in four zones (front left/front right/rear left/rear right). From U.S. Pat. No. 7,560,676 B2 a sunlight-detecting sensor for vehicles is known which allows determining the angle of incidence at which the sunlight enters the vehicle. In particular, the sunlight-detecting sensor has a housing mountable on an inside of either a front window or a rear window. A sunlight sensor is provided on a top of the housing. The sunlight sensor includes a first sensor, a second sensor, and a sensor holder. There is a printed circuit board (PCB) mounted between the sunlight sensor and the housing to transmit electrical signals that are proportional to an amount of sunlight measured on the sunlight sensor. A cover is provided which is made of a transparent material and mounted on the top of the housing, and a blocker provided on the cover between the first and second sensors and inducing differences in amounts of sunlight measured by the first and second sensors when a position of the sun is changed by a certain angle from a center of the sensors.

However, this known arrangement has the disadvantage that it is bulky and expensive to be fabricated. In particular, this arrangement cannot be mounted directly on the inner surface of the windshield. Moreover, this concept is not compatible with modern surface mount technology (SMT).

There is still a need for a radiation sensor and a vehicle sensor arrangement that have low space requirements and can be fabricated economically, at the same time being robust and yielding accurate measurement results.

SUMMARY

This object is solved by the subject matter of the independent claims. Advantageous embodiments of the present invention are the subject matter of the dependent claims.

The present invention is based on the idea that a radiation sensor which can differentiate the angle of incidence of the radiation to be measured can be realized in a particularly efficient way by mounting a light screen on an SMT substrate carrying two SMT photodetectors, so that an asymmetric response to the position of the source of the incident radiation is generated. In particular, a radiation sensor according to the present invention comprises at least one first and one second photodetector, and a radiation shaping element. The radiation shaping element comprises radiation blocking means for forming at least one aperture, preferably at least two apertures, through which the radiation has limited access to said first and second photodetectors, wherein said first and second photodetectors are arranged on a substrate and are distanced apart from each other along a sensor axis, and wherein the radiation blocking means is formed by a radiation screen mounted on the substrate to encompass the first and second photodetectors.

Advantageously, the solution according to the present invention requires significantly less space than conventional arrangements and may be assembled with a much shorter distance to the windshield. Furthermore, the radiation sensor according to the present invention allows larger tolerances for the lateral positioning of the photodetectors versus the radiation screen without changing the area exposed to the radiation and thus the angular response to the radiation. Moreover, the present invention provides a low cost design with simple assembly steps and few well-established materials to be used. For instance, the radiation screen may be fabricated from an opaque plastic material, such as acrylonitrile butadiene styrene (ABS), polycarbonate (PC), polybutylene terephthalate (PBT), polyamide (PA), or the like. Advantageously, PBT is used according to the present invention. In the context of the present application, the term "opaque" is intended to mean "blocking the sunlight radiation".

According to a further advantageous embodiment, the radiation sensor comprises a diffuser element which is covering the at least one aperture for diffusing the radiation. This allows for the incident radiation to be distributed more evenly over the sensitive area of the photodetector and avoids hot spots. A particularly effective and simple way to realize such a diffuser element is to form it as a sheet fabricated from a plastic material. Such a diffuser may be fabricated from a variety of materials, including film, semi-rigid, and rigid sheets. Optical performance is comparable for the various materials. Also, fabrics can be used according to the present invention. The material may for instance be opal polycarbonate, polystyrene, or an acrylic material.

Acrylic generally has superior optical properties compared with polycarbonate. It offers good light transmission and diffusion of hot spots, and is easy to fabricate.

Polycarbonate, on the other hand, is tougher and more durable than acrylic. It can operate at a higher temperature, and has superior flammability characteristics. Polycarbonate sheet and film have good light transmission, excellent diffusion, and offer impact resistance along with good heat resistance. Polycarbonate film offers additional benefits including flexibility and formability. Finally, polycarbonate is available in UV stabilized grades that are engineered for outdoor use. These advantages are of course also valid for an opaque polycarbonate that can be used for the radiation screen.

Moreover, the diffuser element may also have an optical filter function in order to let pass only particular wavelengths, for instance infra red radiation. Thereby, the influence of other radiation sources, such as the light of oncoming vehicles in case of a sunlight sensor can be eliminated.

According to an advantageous embodiment of the present invention, the first and second photodetectors comprise surface mount devices (SMD).

Compatibility with SMT concepts and the possibility to mount the radiation sensor directly on the windshield allows integrating further sensors, such as rain sensors or humidity sensors. In SMT, components are placed directly onto the surface of a PCB in order to create what is known as a surface mount device (SMD). Due to its efficiency and effectiveness, SMT has widely replaced through-hole technology methods for constructing PCBs. Generally speaking, SMT components are smaller in size than through-hole units as they have smaller leads or do not have any leads at all. The primary advantage to SMT, of course, is size. In addition to the fact that these units are not as bulky as older devices, there is also a much higher component density, as well as more connections per each component. This means that electronics can be more efficient and advanced than ever before, while still being as compact as possible. Fewer holes need to be drilled into the boards which leads to faster and more automated assembly processes, and the fact that components are able to be situated on either side of the circuit board simplifies things further. On top of this, there are many SMT parts and components that actually cost less than their through-hole counterparts. All of this results in a lower initial cost, less time required for setting up and production, reduced manufacture cost, and a more efficient use of time.

According to a further advantageous embodiment, the radiation screen is formed as a molded part from a material blocking the radiation to be detected, in particular the sun light. As mentioned above, this material may for instance be an opaque polycarbonate. Generally, opaque PC is well suited for thermoforming, bending or machining. It has high impact strength, a wide temperature range, and is easy to fabricate. However, it is clear for a person skilled in the art that any other light impervious material may also be used for fabricating the radiation screen.

Advantageously, a first aperture is provided for the first photodetector and a separate second aperture is provided for the second photodetector. Thereby, an asymmetric response to the incident radiation can easily be achieved, at the same time allowing for larger tolerances of the lateral position of the photodetectors versus the radiation screen.

According to an advantageous embodiment of the present invention, the first aperture is shaped to block radiation with a first critical angle when incident with an angle smaller than 90° with said sensor axis and wherein the second aperture is shaped to block radiation with a different second critical angle when incident with an angle between 90° and 180° with the sensor axis. Thus, the photodetectors' responses differ as a function of the radiation source's position. In order to achieve a symmetry regarding the sensitivity towards the radiation source's position, the first and second apertures may be symmetric to each other with respect to a mirror plane perpendicularly intersecting said sensor axis. Advantageously, the first and second apertures are designed to mask the sensing area of the photodetector, thus offering the advantage of removing any sensor to sensor response dispersion related to SMT positioning of the photodetector components.

For providing a signal transduction already at the site of measurement, thereby reducing the influence of disturbances, the radiation sensor may further comprise a controller for evaluating the output signals of said first and second photodetectors and for calculating an intensity of the radiation and a position of a source of the radiation with respect to said sensor axis.

According to an advantageous embodiment of the present invention, the radiation sensor comprises a third photodetector, wherein the first photodetector, the second photodetector, and the third photodetector are arranged so that their respective middle axes include angles of 120° between each other. Thereby it is possible to evaluate the signals of the three photodetectors to yield the information not only about the azimuth, but also about the elevation. This is particularly advantageous when using the radiation sensor as a sunload sensor in a car.

The present invention may advantageously be employed with a vehicle sensor arrangement comprising a radiation sensor according to the present invention for detecting a sun load acting on said vehicle, said vehicle sensor being mountable adjacent to a windshield inner surface of said vehicle. As mentioned above, such a vehicle sensor arrangement does not only comprise a sunload sensor, but also comprises at least one additional sensor component for detecting relative humidity inside the vehicle and/or for detecting moisture at an outer surface of said windshield.

The present invention also relates to a method of assembling a vehicle sensor arrangement, the method comprising the following steps:
  providing a substrate with at least one first and one second photodetector mounted thereon, said first and second photodetectors being distanced apart from each other along a sensor axis;
  mounting a radiation screen that forms a shaping element on the substrate, so that said first and second photodetectors are encompassed by said radiation screen, wherein said radiation shaping element comprises radiation blocking means for forming at least one aperture through which the radiation has limited access to said first and second photodetectors.

According to an advantageous embodiment, the method further comprises the step of attaching a diffuser element which is covering the at least one aperture for diffusing the radiation.

Advantageously, the first and second photodetectors are mounted on the substrate by means of a surface mount technology (SMT).

Advantageously, the vehicle sensor arrangement according to the present invention is directly attached to an inner surface of a windshield of said vehicle, so that the radiation from outside the vehicle has access to the first and second photodetectors.

The accompanying drawings are incorporated into the specification and form a part of the specification to illustrate several embodiments of the present invention. These drawings, together with the description serve to explain the principles of the invention. The drawings are merely for the purpose of illustrating the preferred and alternative examples of how the invention can be made and used, and are not to be construed as limiting the invention to only the illustrated and described embodiments. Furthermore, several aspects of the embodiments may form—individually or in different combinations—solutions according to the present invention. The following described embodiments thus can be considered either alone or in an arbitrary combination thereof. Further features and advantages will become apparent from the following more particular description of the various embodiments of the invention, as illustrated in the accompanying drawings, in which like references refer to like elements.

BRIEF DESCRIPTION OF THE DRAWINGS

FIG. 13 is a schematic top view of a radiation sensor arrangement with two photodetectors; and FIG. 14 is a schematic top view of a radiation sensor arrangement with three photo detectors.

DETAILED DESCRIPTION

The present invention will now be explained in more detail with reference to the Figures and firstly referring to FIGS. 1 and 2.

Figure 1:
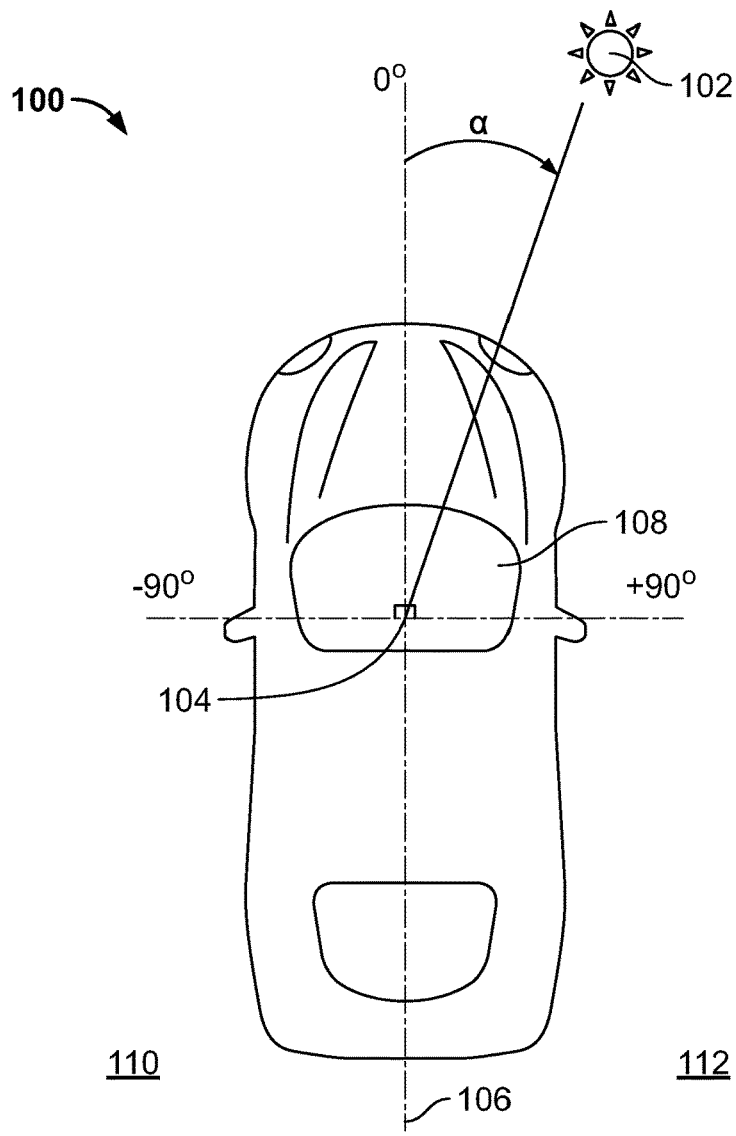
FIG. 1 is a schematic representation of a vehicle seen from above.

FIG. 1 shows a top view of a vehicle 100 for illustrating the angle of incidence of the radiation emitted by the sun 102. The angle $\alpha$ included with the longitudinal axis 106 (coinciding with the direction of forward travelling) under which a sunload sensor 104 attached to the windshield 108 "sees" the sun is referred to as the azimuth. The azimuth ranges from $\alpha=-90°$ to $\alpha=+90°$. The longitudinal axis 106 separates the left side 110 from the right side 112 of the vehicle.

Figure 2:
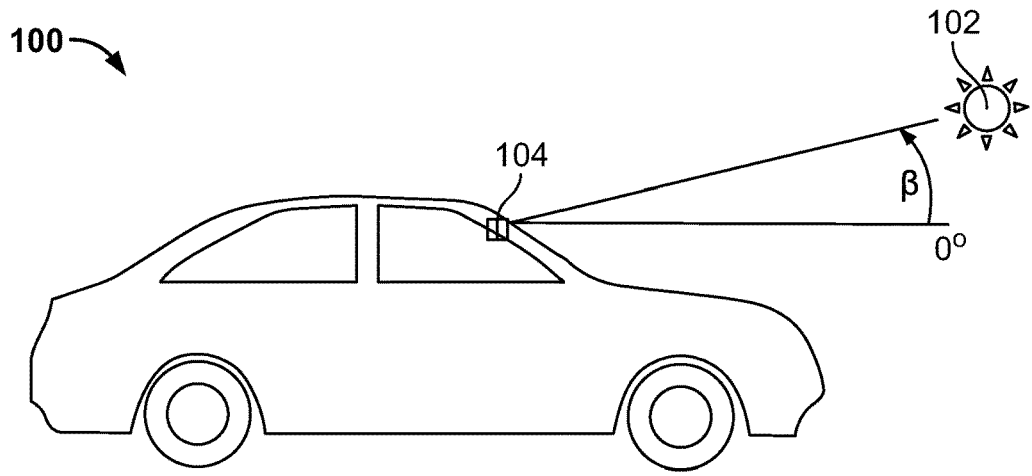
FIG. 2 is a schematic representation of a vehicle seen from the side.

FIG. 2 illustrates a side view of the vehicle 100, showing the elevation $\beta$ under which the radiation from the sun 102 impinges on the site where the sunload sensor 104 is located. In the following, the sunload sensor 104 according to the present invention is always described as being able to distinguish between different azimuths $\alpha$ in order to assess a different sunload acting on the right and left side of the vehicle, respectively. However, it is clear for a person skilled in the art that the same principles apply for a sensor being sensitive towards different elevations $\beta$ by accordingly turning the direction of assembly or providing additional photodetectors. Moreover, as will become apparent later with reference to FIG. 14, a sensor arrangement with three photodetectors can be used for detecting the azimuth $\alpha$ as well as the elevation $\beta$.

Figure 3:
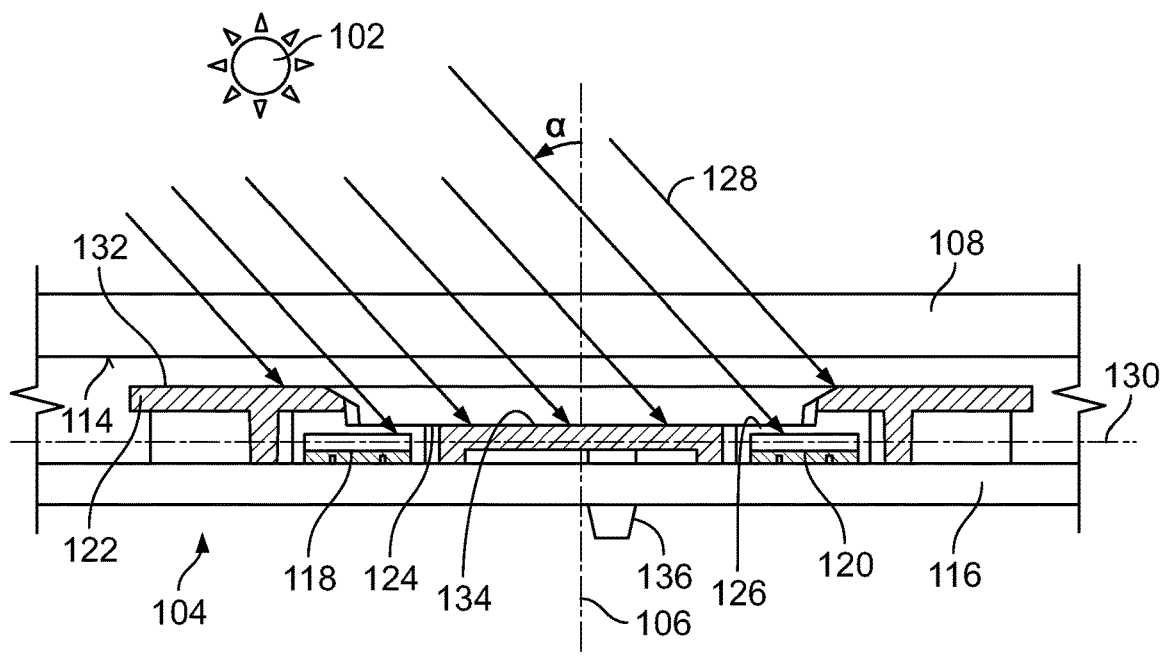
FIG. 3 is a schematic sectional view of a sunload sensor according to a first embodiment mounted on the inner surface of a vehicle windshield.

FIG. 3 illustrates a first advantageous embodiment of a sunload sensor 104 according to the present invention. The sunload sensor 104 is mounted at an inner surface 114 of the windshield 108. It has to be noted that the sunload sensor 104 may of course also be mounted at any other transparent pane, such as the rear window or a transparent roof. Moreover, the sunload sensor according to the present invention may also be used together with an air conditioning system of a building and may be installed at any window, or transparent pane or roof. The sunload sensor 104 is mounted close to the inner surface 114 of the windshield 108, leaving an air gap between the sensor and the windshield. However, if needed, also a coupling layer (not shown in the Figures) may be applied between the sensor and the windshield 108, or the sensor 104 may directly touch the inner surface 114.

The sunload sensor 104 comprises a substrate 116. A first photodetector 118 and a second photodetector 120 are arranged on the substrate 116. Advantageously, these photodetectors are formed by SMD photodiodes. According to the present invention, the sunload sensor 104 further comprises a radiation screen 122 which is mounted on the substrate 116 so as to encompass the first photodetector 118 and the second photodetector 120.

A first aperture 124 and a second aperture 126 allow the sunlight accessing the first and second photodetectors 118, 120 in an angle-dependent way. in the example shown in FIG. 3, the sun 102 is in a position that it includes an azimuth $\alpha$ of about −30° with the axis 106. In this constellation, only the second photodetector 120 is directly illuminated by the incident radiation 128. According to the present invention, the radiation screen 122 prevents sunlight from directly falling on the first photodetector 118. Consequently, the sensor 104 can calculate from the combined signal of the first photodetector 118 and the second photodetector 120 and intensity as well as an angle of the incident radiation 128. This information can be used by the HVAC system to control the left side and right side air-conditioning accordingly.

With respect to the middle axis 106, the first photodetector 118 and the second photodetector 120 are arranged equidistantly along a second axis 130 that is parallel to the substrate surface. Moreover, also the radiation screen 122 and in particular the first and second apertures 124, 126 are symmetric with respect to the middle axis 106.

According to this embodiment, the outer regions 132 of the screen 122 are raised higher than a central region 134 in order to generate an asymmetric blocking of the radiation 128. The asymmetric response of the two photodetectors 118, 120 allows retrieving the information about the angle of incidence of the radiation to be measured.

Moreover, the first and second apertures 124, 126 have smaller dimensions compared to the photodetectors 118, 120 and are located off-center compared to the sensitive areas of the photodetectors.

The radiation screen 122 is formed from a molded opaque plastic material and is directly attached to the SMT substrate 116. As can be seen from this Figure, the outer regions 132 partly overlap the apertures 124, 126. Thereby, an asymmetric response of the first and second photodetectors 118, 120 is generated and allows calculating the angle of incidence and the intensity of the radiation. The central region 134 is arranged closer to the substrate 114 than the outer regions 132. Fixing means 136 are provided for attaching the radiation screen 122 to the substrate 116. The fixing means 136 is formed by a projection that is formed to be pressed into a belonging opening provided in substrate 116. The fixing means may also comprise openings arranged in the outer regions 132 that receive belonging bolts or screws (not shown in the Figures).

Figure 4:
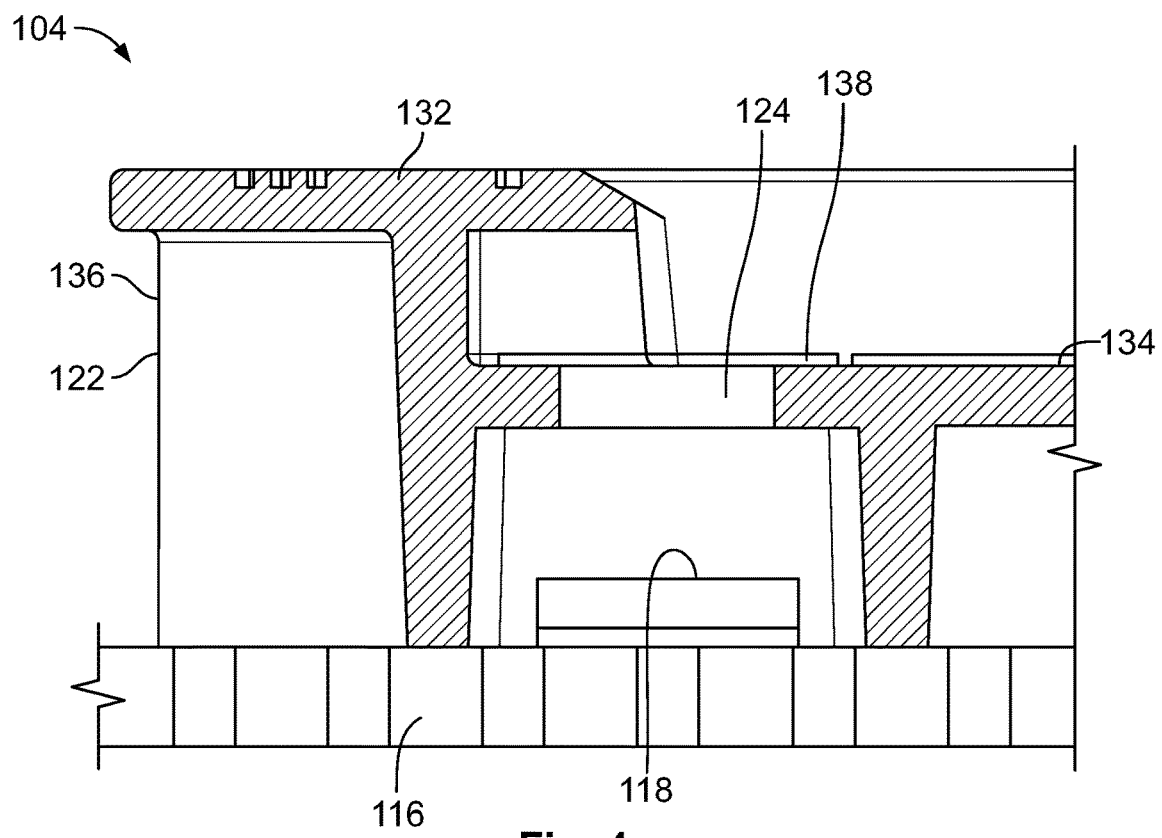
FIG. 4 is a detailed sectional view of a sunload sensor according to a second embodiment.

FIG. 4 illustrates a further embodiment of the sunload sensor according to the present invention. According to this embodiment, the first (and also the second) apertures 124, 126 are covered with a thin sheet of diffuser material forming a diffuser element 138. The diffuser element 138 may either be one integral sheet for both apertures 124, 126 or may be formed by separate pieces as shown in FIG. 4. As mentioned above, the diffuser element 138 allows for the incident radiation to be distributed more evenly over the sensitive area of the photodetector 118, 120 and avoids hot spots. A particularly effective and simple way to realize such a diffuser element 138 is to form it as a sheet fabricated from a plastic material. Such a diffuser element 138 may be fabricated from a variety of materials, including film, semi-rigid, and rigid sheets. Optical performance is comparable for the various materials. Also, fabrics can be used according to the present invention. The material may for instance be opal polycarbonate, polystyrene, or an acrylic material.

Moreover, the diffuser element 138 may also function as an optical filter in order to let pass only particular wavelengths, for instance infra red radiation. Thereby, the influence of other radiation sources, such as the light of oncoming vehicles in case of a vehicle sunlight sensor can be eliminated.

However, the principles of the present invention may be realized in a particularly simple and cost effective manner without using a diffuser element, thereby also enhancing the sensitivity of the sensor.

Figure 5:
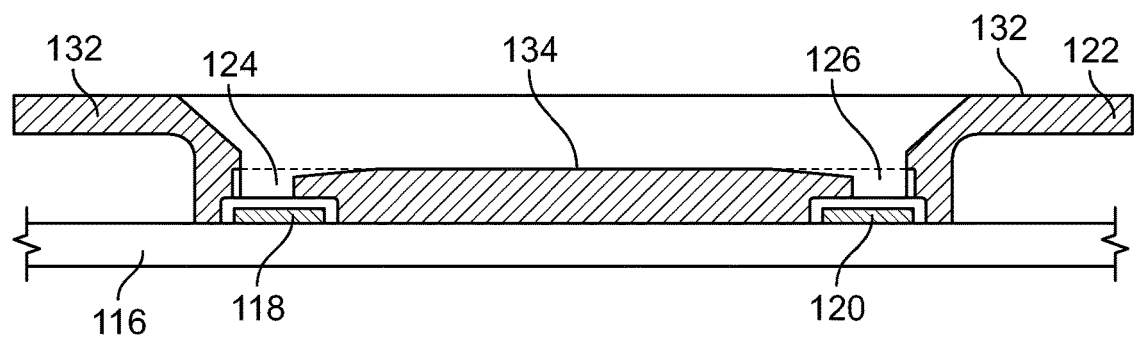
FIG. 5 is a schematic sectional view of a sunload sensor according to a further embodiment.
Figure 7:
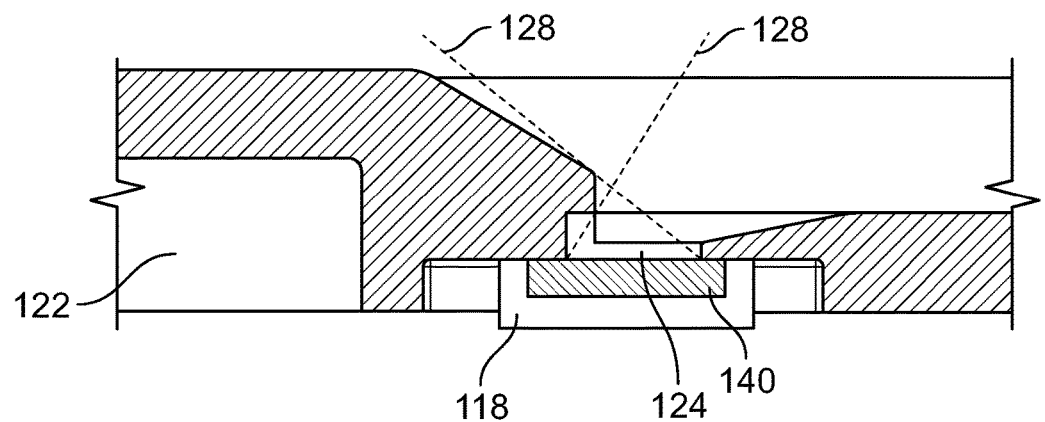
FIG. 7 is a detailed sectional view of the sunload sensor shown in FIG. 6.

FIG. 5 shows a further embodiment of the present invention in a schematic sectional view. In contrast to the previously discussed embodiments, the first aperture 124 and the second aperture 126 are located closer to the surface of the first and second photodetectors 118, 120. This arrangement has the advantage that it needs small space and, as will be apparent from FIGS. 13 to 14, is less sensitive towards lateral position tolerances of the photodetectors. As shown in FIG. 7, the radiation screen 122 overlaps the first and second photodetectors 118, 120 not only in the peripheral regions 132 but also with the central region 134. According to the present invention, the height as seen from the substrate 116 differs in the peripheral regions 132 from the height in the central region 134, so that an asymmetric response of the two photodetectors 118, 120 is generated.

Figure 6:
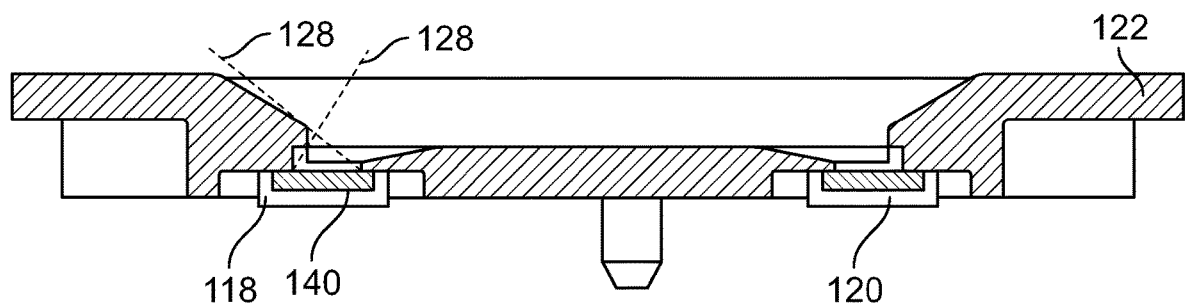
FIG. 6 is a schematic sectional view of a sunload sensor according to a further embodiment.

FIGS. 6 and 7 illustrate a further advantageous embodiment of a radiation sensor according to the present invention. FIG. 7 is a detail showing the region around the first photodetector 118. In contrast to the previously described embodiments, with the arrangement according to FIGS. 6 and 7 the radiation screen 122 directly touches the photodetectors 118, 120. As can be seen in particular from FIG. 7, the first and second apertures 124, 126 are smaller than the sensitive areas 140 of the first and second photodetectors 118, 120. In other words, the first and second apertures 124, 126 mask the sensitive areas 140 of the first and second photodetectors 118, 120. Consequently, the arrangement is much less sensitive towards lateral displacement and tolerances of the photodetectors 118, 120.

Moreover, with the embodiment shown in FIGS. 6 and 7, the SMD photodetectors 118, 120 may first be attached to the radiation screen 122 and only then be mounted on the substrate (not shown in this Figures), the electrical connections being established e. g. by reflow soldering. This solution has the advantage of a very cost effective assembly procedure.

Figure 8:
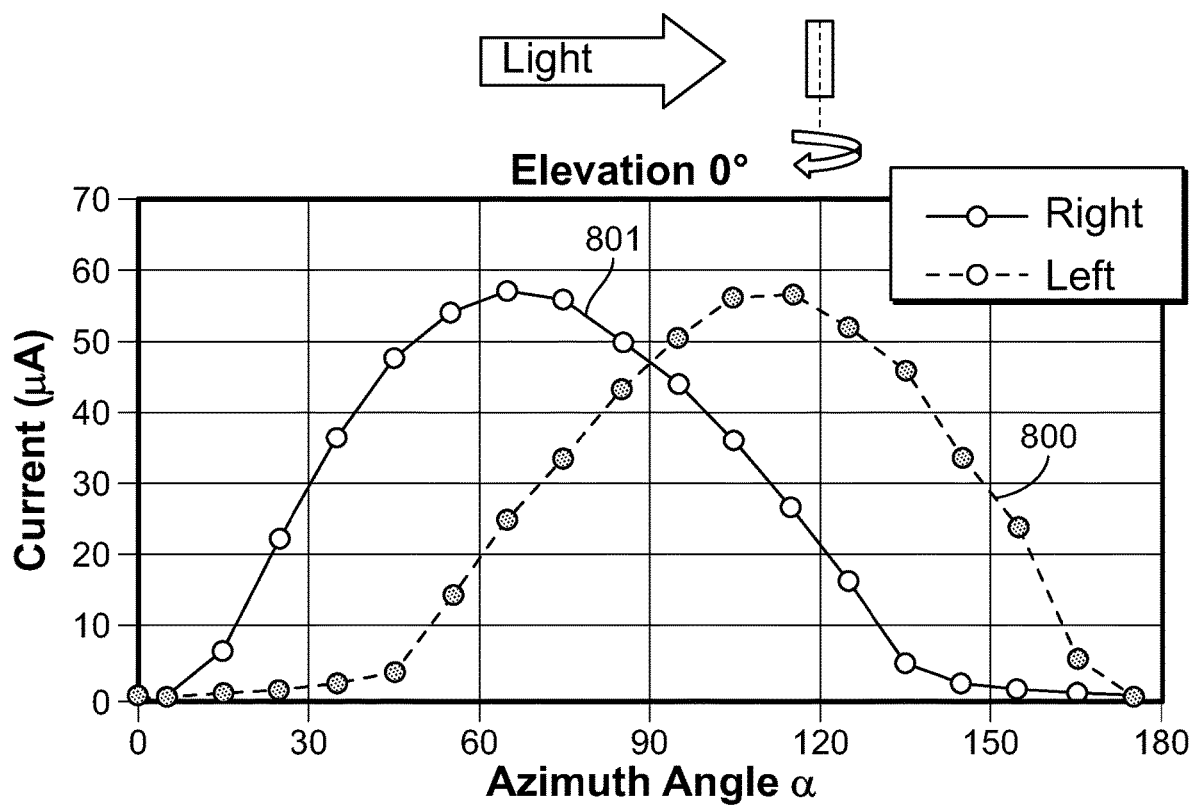
FIG. 8 is a schematic diagram of the measured signals for an elevation of 0°.
Figure 9:
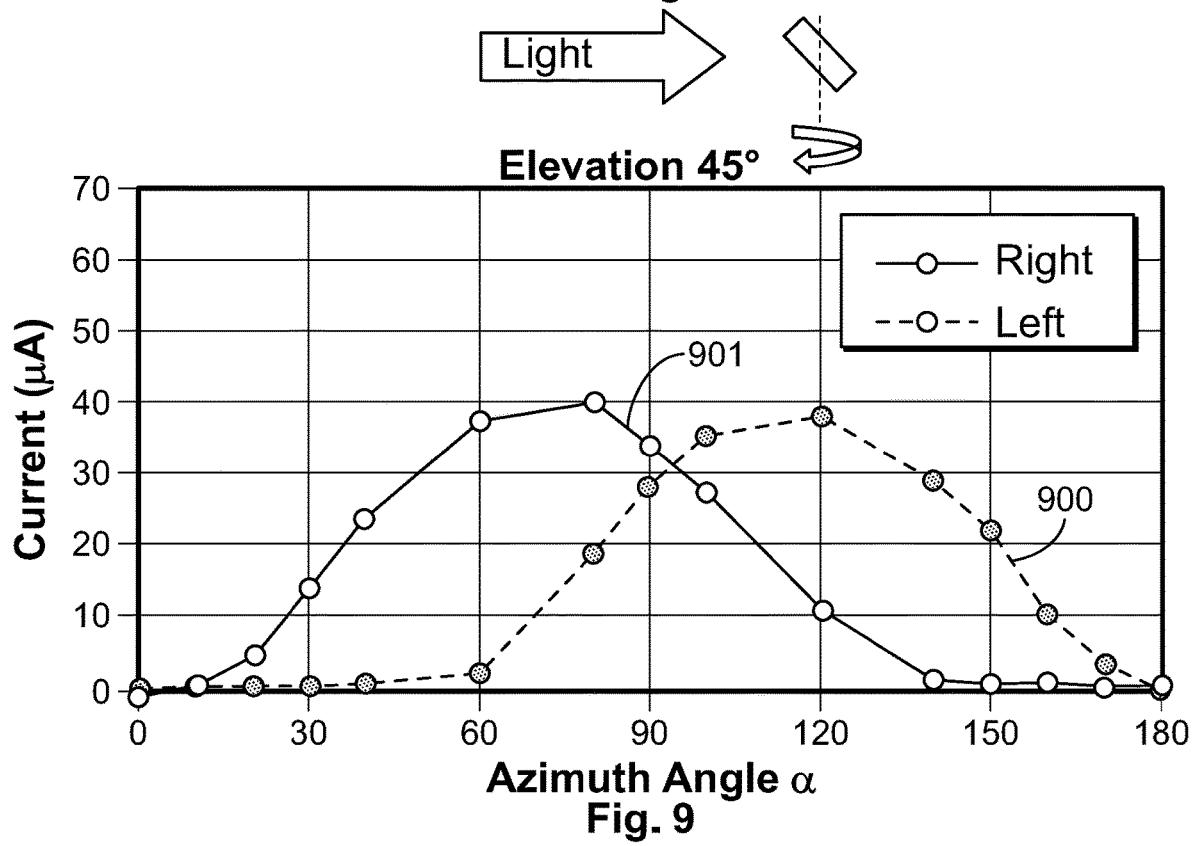
FIG. 9 is a schematic diagram of the measured signals for an elevation of 45°.

Referring back to the sensor arrangement shown in FIG. 3, FIG. 8 and FIG. 9 show the measurement signals of the first and second photodetectors, here the current of a photodiode, as a function of the azimuth a (from 0° to 180° corresponding to a range from −90° to +90°) for an elevation β of 0° (FIG. 8) and an elevation β of 45° (FIG. 9). Curves 800 and 900 represent the signals for the left detector 118, and curves 801 and 901 represent the signals of the right detector 120. As can be seen from these plots, the azimuth a can easily be calculated from a combination of the signals 801 and 800 or 901 and 900. For an elevation of 45°, the signal intensity is significantly lower, however, the azimuth a can still be determined from a combination of the two sensor signals 901 and 900.

Figure 10:
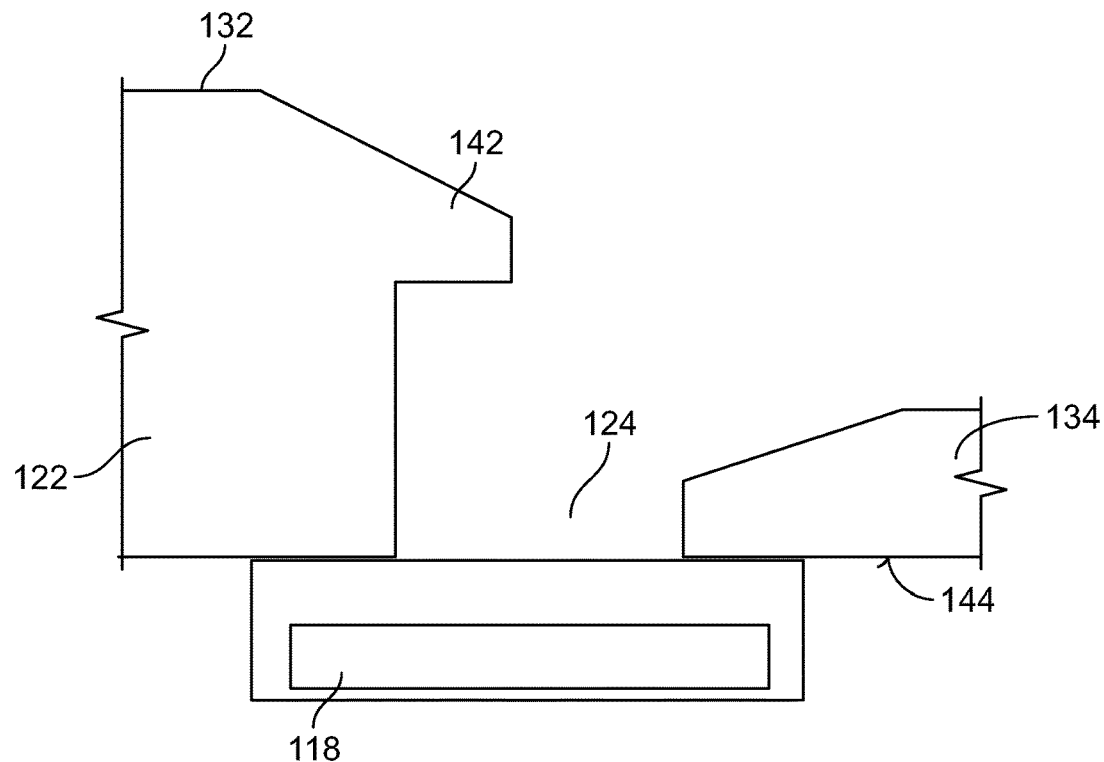
FIG. 10 is a schematic detailed sectional view of the sunload sensor shown in FIG. 5.
Figure 11:
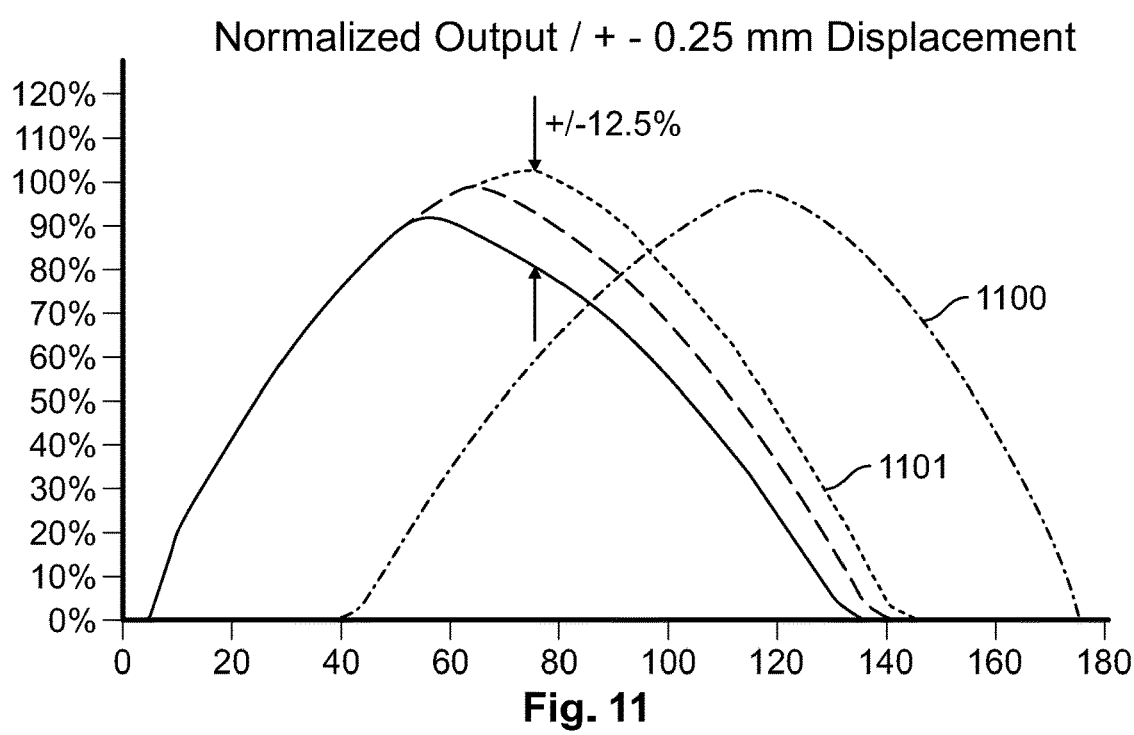
FIG. 11 is a schematic diagram of the measured signals for the arrangement of FIG. 3, illustrating the influence of the tolerances of the photodetectors' position.
Figure 12:
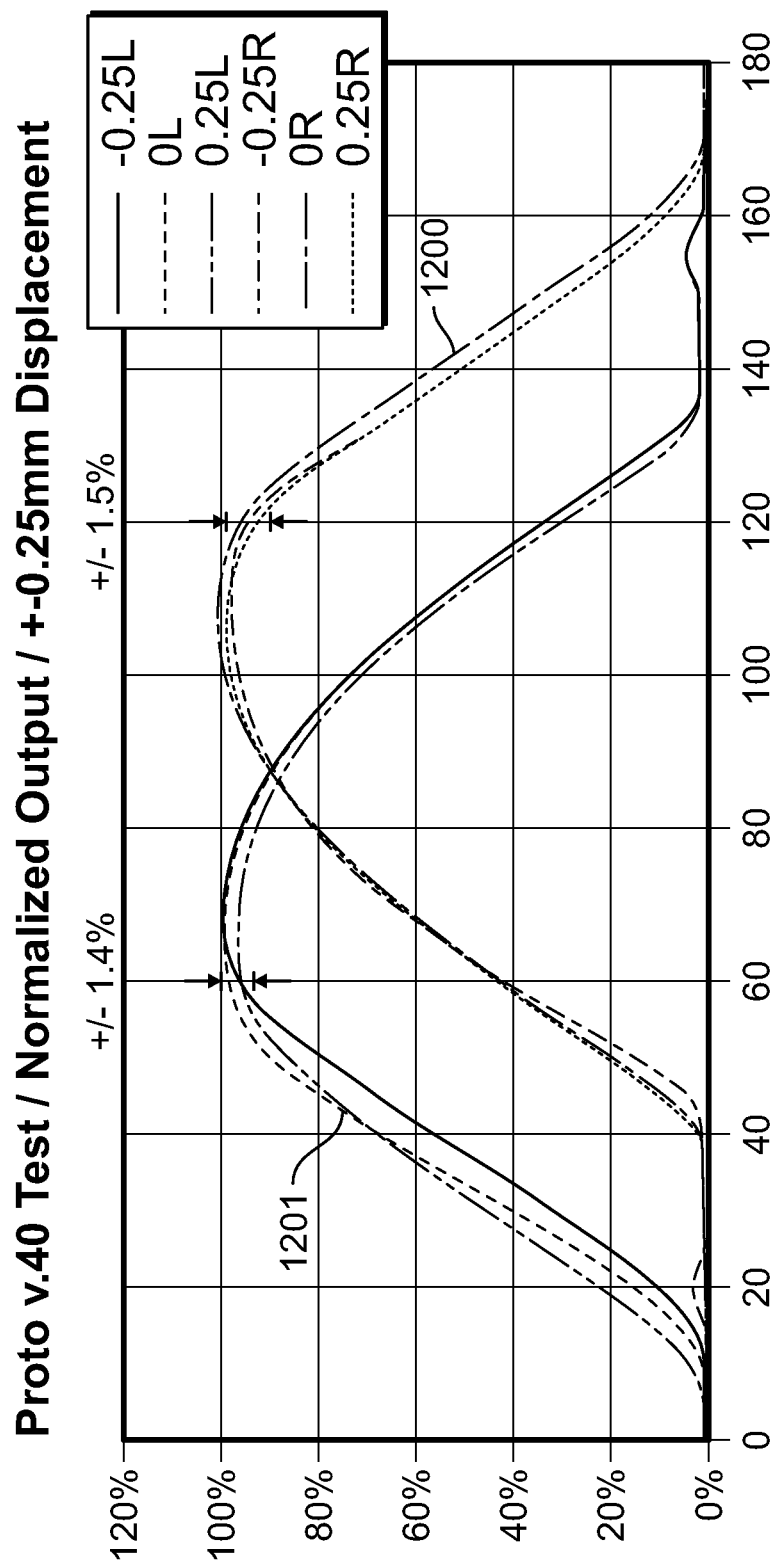
FIG. 12 is a schematic diagram of the measured signals for the arrangement of FIG. 5, illustrating the influence of the tolerances of the photodetectors' position.

FIGS. 10 to 12 illustrate the effect of modifying the radiation screen geometry on the radiation sensor sensitivity towards a lateral displacement of the photodetector with respect to the position of the radiation screen.

FIG. 10 in more detail illustrates the optimized radiation screen geometry as shown in FIG. 6. FIG. 10 only shows the first photodetector 118 and the surrounding radiation screen 122. The second photodetector 120 is structured symmetrically with respect to the middle axis 106. In particular, the outer region 132 of the screen 122 has a chamfered projection 142 that protrudes over the sensitive area of the photodetector 118. The underside 144 of the radiation screen 122 is directly adjacent to the SMD photo detector 118. The central region 134 is also covering a part of the sensor chip forming an aperture 124 which is smaller than the sensitive area of the sensor chip 118, thereby masking the sensitive area of the photodetector.

FIG. 11 shows the normalized measurement signal for the arrangement according to FIG. 3, whereas FIG. 12 shows the normalized measurement signals for a geometry as shown in FIG. 10. Curves 1100 and 1200 represent the signals for the left detector 118, and curves 1101 and 1201 represent the signals of the right detector 120. It can be seen that by a displacement of the photodetector by +/−0.25 mm the arrangement of FIG. 3 yields a signal difference of about +/−12.5% for an azimuth angle α of 60° and 120°. In contrast thereto, the arrangement that is shown in FIG. 10 is much less sensitive and yields a signal deviation of only about +/−1.5%. Consequently, this improved geometry according to the present invention allows compensating for much larger tolerances of the position of the photodetectors with respect to the position of the radiation screen, thereby facilitating the mounting process.

Although in the above detailed description it is always referred to a sun load sensor, it is clear for a person skilled in the art that the inclination dependent intensity measurement according to the present invention can be applied to any sort of electromagnetic radiation that can be blocked by a screen according to the present invention.

Moreover, the present radiation sensor may also be used for alternatively or additionally discern between different elevation angles β.

Accordingly, FIGS. 12 and 13 illustrate top views of two different photodetector arrangements according to the present invention. As can be seen from FIG. 12, an arrangement of two photodetectors 118, 120 (which has been described in detail in the preceding description) has two sensitive areas 140a, 140b. The sensitive areas 140a, 140b are symmetrical with respect to the axis 106 shown e. g. in FIG. 3, but also with respect to the axis 107 (orthogonal to axis 106). The sensitive areas 140a, 140b and the photodetectors 118, 120 are depicted with broken lines because they are covered by the radiation screen 122. The radiation screen allows access for the radiation to the sensitive areas 140a, 140b through the apertures 124, 126. As explained above, due to the asymmetric screening of the sun light accessing the sensitive areas 140a, 140b the difference between the electrical currents of the first and second photo diodes allows determining the sun azimuth a as explained with reference to FIG. 1.

When additionally providing a third photodetector 119, it is possible to also measure the sun elevation β (which is explained with reference to FIG. 2). In particular, a radiation sensor 204 according to another advantageous embodiment as shown in FIG. 14 has a first photodetector 218, a second photodetector 220, and a third photodetector 221. Each of the photodetectors comprises for instance a photo diode and has a sensitive area 240a, 240b, 240c. The photodetectors 218, 220, 221 are covered by a radiation screen 222. The radiation screen 222 has three apertures 224, 226, 227 which are arranged above the photodetectors 218, 220, 221 in order to allow sun light to access the sensitive areas 240a, 240b, 240c.

The sectional view of each photodetector 218, 220, 221 with the belonging region of the radiation screen 222 may for instance look as shown in FIG. 10, when taking the respective middle axis 230a, 230b, 230c as the cut line.

According to the exemplary embodiment of FIG. 14, the three middle axes 230a, 230b, 230c include angles of 120° with each other, so that the photodetectors 218, 220, 221 are arranged to form an equilateral triangle. With the radiation sensor 204 it is possible to determine not only the azimuth a, but also the elevation β.

When assuming that all photodetectors comprise photodiodes, the following scheme can be used for evaluating the measured signal. Firstly, for measuring the azimuth a, the difference of the current generated by the first photodiode 218 and the current generated by the second photodiode 220 is calculated. This differential value yields the information about the azimuth a.

Furthermore, for calculating the elevation β, the current generated by the first photodiode 218 and the current generated by the second photodiode 220 are added, and this sum value is subtracted from the current generated by the third photodiode 221. The calculations can be performed either by an integrated microcontroller which is a part of the radiation sensor assembly or by an external controller which is for instance a part of the vehicle control system.

REFERENCE NUMERALS

| Reference Numeral | Description |
| --- | --- |
| 100 | Vehicle |
| 102 | Sun |
| 104, 204 | Sunload sensor; radiation sensor |
| 106 | Longitudinal axis |
| 108 | Windshield |
| 110 | Left side |
| 112 | Right side |
| 114 | Inner surface of windshield |
| 116 | Substrate |
| 118, 218 | First photodetector |
| 120, 220 | Second photodetector |
| 221 | Third photodetector |
| 122, 222 | Radiation screen |
| 124, 224 | First aperture |
| 126, 226 | Second aperture |
| 227 | Third aperture |
| 128 | Radiation |
| 130 | Sensor axis |
| 230a, 230b, 230c | Middle axis of photodetector |
| 132 | Outer regions |
| 134 | Central region |
| 136 | Fixing means |
| 138 | Diffuser element |
| 140; 140a, 140b; 240a, 240b, 240c | Sensitive area |
| 142 | Chamfered projection and call |
| 144 | Underside of radiation screen |

What is claimed is:

1. A radiation sensor comprising:
at least one first and one second photodetector arranged on a substrate and distanced apart from one another along a sensor axis; and
a radiation screen mounted on the substrate and disposed above and encompassing the first and second photodetectors, wherein the radiation screen comprises a central region that extends along the sensor axis between the first and second photodetectors, wherein the radiation screen comprises outer regions located along outer edges of the radiation screen, wherein the central region is interposed between the outer regions and is sized longer than the outer regions, wherein the central region is positioned closer to the substrate than the outer regions, wherein the central region is a continuous opaque structure that comprises a first aperture positioned over the first photodetector and a separate and spaced apart second aperture positioned over the second photodetector, wherein the first and second apertures are sized smaller than the respective first and second photodetectors, wherein the first outer region is above the central region adjacent the first aperture and is configured to block passage of incident radiation through the first aperture to the first photodetector when the incident radiation is within a first range of angles relative to the sensor axis, wherein the second outer region is disposed above the central region adjacent the second aperture and is configured to block passage of incident radiation through the second aperture to the second photodetector when the incident radiation is within a second range of angles relative to the sensor axis, wherein at least some of the angles of incident radiation in the second range of angles are not within the first range of angles, and wherein at least some of the angles of incident radiation in the first range of angles are not within the second range of angles.

2. The radiation sensor according to claim 1, wherein said first and second photodetectors comprise surface mount devices.

3. The radiation sensor according to claim 1, wherein said radiation screen is formed as a molded part from a light impervious material.

4. The radiation sensor according to claim 1, wherein each of the first and second apertures are positioned a distance above the respective first and second photodetectors.

5. The radiation sensor according to claim 1, wherein at least one of the first outer region or second outer region includes a section that projects over a portion of the respective first aperture or second aperture.

6. The radiation sensor according to claim 1, wherein the first and second apertures are symmetric to each other with respect to a mirror plane perpendicularly intersecting said sensor axis.

7. The radiation sensor according to claim 1, where the first and second apertures are dimensioned to mask at least one partial area of a sensitive surface area of the first and second photodetectors, respectively.

8. The radiation sensor according to claim 1, further comprising a controller for evaluating the output signals of said first and second photodetectors and for calculating an intensity of the radiation and a position of a source of the radiation with respect to said sensor axis.

9. The radiation sensor according to claim 1, further comprising a third photodetector, wherein the first photodetector, the second photodetector, and the third photodetector are arranged so that their respective middle axes include angles of about 120° between each other.

10. A vehicle sensor arrangement comprising a radiation sensor according to claim 1 for detecting a sun load acting on said vehicle, said vehicle sensor being mountable adjacent to an inner surface of a windshield of said vehicle.

11. The vehicle sensor arrangement according to claim 10, further comprising at least one additional sensor component for detecting relative humidity inside the vehicle and/or for detecting moisture at an outer surface of said windshield.

12. A method of assembling a vehicle sensor arrangement, the method comprising the following steps:
providing a substrate with at least one first and one second photodetector mounted thereon, said first and second photodetectors being distanced apart from each other along a sensor axis; and
mounting a radiation screen on the substrate so that said first and second photodetectors are encompassed by said radiation screen, wherein said radiation screen comprises a central region that extends along the sensor axis between first and second outer regions at respective first and second outer edges of the radiation screen, wherein the central region comprises a first aperture located above the first photodetector and separate second aperture located above the second photodetector, wherein the first and second outer regions are disposed above the central region and positioned adjacent respective first and second apertures, wherein the first and second outer regions are configured to generate an asymmetric blocking of incident radiation from the sun relative to the first and second photodetectors.

13. A method according to claim 12, wherein said first and second photodetectors are mounted on the substrate by means of a surface mount technology.

14. A method according to claim 12, further comprising the step of attaching the vehicle sensor arrangement to an inner surface of a windshield of said vehicle so that the radiation from outside the vehicle has access to the first and second photodetectors.

15. A method according to claim 12, wherein the radiation sensor comprises a third photodetector, wherein the first photodetector, the second photodetector, and the third photodetector are arranged so that their respective middle axes include angles of about 120° between each other, and wherein the method comprises the step of calculating an azimuth and the step of calculating an elevation.

16. The radiation sensor according to claim 12, wherein the radiation screen center region is sized longer than each of the first and second outer regions, wherein each outer region comprises an outwardly extending section that is parallel with the sensor axis, and wherein the first and second apertures are each sized smaller than the respective first and second photodetectors.

17. The radiation sensor according to claim 1, wherein the first and second outer regions are configured to generate an asymmetric blocking of the incident radiation relative to the first and second photodetectors.

18. A radiation sensor comprising:
a substrate comprising first and second photodetectors disposed thereon and separated by one another along a sensor axis; and
a radiation screen attached to the substrate and encompassing the first and second photodetectors, the radiation screen comprising:
a central region in the form of a continuous opaque structure comprising a first aperture disposed over the first photodetector and a separate second aperture disposed over the second photodetector; and
first and second outer regions that are located at respective first and second outer edges of the radiation screen, wherein the central regions is interposed between the first and second outer regions, wherein the first and second outer regions are positioned above the central region with the central region positioned closest to the substrate, and wherein the first and second outer regions each include sections located adjacent respective first and second apertures that are configured to generate an asymmetric blocking of incident radiation from the sun relative to the first and second photodetectors.

19. The radiation sensor as recited in claim 18, wherein the radiation screen comprising the central and first and outer regions is a one-piece construction.

20. The radiation sensor as recited in claim 18, wherein at least one of the first outer region or second outer region is disposed over a portion of the respective first aperture or second aperture.

* * * * *